US007671752B2

(12) United States Patent
Sofer

(10) Patent No.: US 7,671,752 B2
(45) Date of Patent: Mar. 2, 2010

(54) CAR ALCOHOL MONITORING SYSTEM

(76) Inventor: Stephanie Sofer, 300 E. 93rd St., Apt. #15A, New York, NY (US) 10128

( * ) Notice: Subject to any disclaimer, the term of this patent is extended or adjusted under 35 U.S.C. 154(b) by 15 days.

(21) Appl. No.: 11/354,227

(22) Filed: Feb. 13, 2006

(65) Prior Publication Data

US 2006/0202842 A1    Sep. 14, 2006

Related U.S. Application Data

(60) Provisional application No. 60/652,348, filed on Feb. 11, 2005.

(51) Int. Cl.
G08B 23/00    (2006.01)
(52) U.S. Cl. .................... 340/576; 340/573.1; 180/272
(58) Field of Classification Search ................ 340/576, 340/573.1, 575; 180/272; 600/300
See application file for complete search history.

(56) References Cited

U.S. PATENT DOCUMENTS

| 3,823,382 | A | * | 7/1974 | Gaddy ........................ 180/272 |
| 3,878,915 | A | * | 4/1975 | Purland et al. .............. 180/170 |
| 4,507,736 | A | * | 3/1985 | Klatt ............................ 701/52 |
| 4,905,498 | A | | 3/1990 | O'Donnell et al. ........... 73/23.1 |
| 4,933,859 | A | * | 6/1990 | Tsuyama et al. .............. 701/93 |
| 5,220,919 | A | * | 6/1993 | Phillips et al. .............. 600/345 |
| 5,684,703 | A | * | 11/1997 | Itoh et al. ................... 701/200 |
| 5,793,292 | A | * | 8/1998 | Ivey, Jr. ...................... 340/576 |
| 5,874,889 | A | * | 2/1999 | Higdon et al. ......... 340/426.36 |
| 5,969,615 | A | * | 10/1999 | Ivey et al. ................... 340/576 |
| 6,075,444 | A | | 6/2000 | Soh'ege et al. ............. 340/576 |
| 6,620,108 | B2 | | 9/2003 | Duval et al. ................. 600/532 |
| 6,925,381 | B2 | * | 8/2005 | Adamczyk ................... 701/210 |
| 7,119,696 | B2 | * | 10/2006 | Borugian ..................... 340/576 |
| 7,204,335 | B2 | * | 4/2007 | Stewart et al. .............. 180/272 |
| 7,256,700 | B1 | * | 8/2007 | Ruocco et al. .............. 340/576 |
| 2002/0084130 | A1 | * | 7/2002 | Der Ghazarian et al. .... 180/272 |
| 2002/1008413 | | * | 7/2002 | Der Ghazarian et al. .... 180/272 |
| 2002/0101366 | A1 | * | 8/2002 | Flick ........................... 340/988 |
| 2002/0138351 | A1 | * | 9/2002 | Houvener et al. ............. 705/18 |
| 2003/0095046 | A1 | * | 5/2003 | Borugian ..................... 340/576 |
| 2003/0218004 | A1 | * | 11/2003 | Yoneyama et al. .......... 219/528 |
| 2003/0218544 | A1 | * | 11/2003 | Shinada ...................... 340/575 |
| 2004/0083031 | A1 | * | 4/2004 | Okezie .......................... 701/1 |

(Continued)

OTHER PUBLICATIONS

OnStar System Puts Telematics on the Map- Jan. 10, 2005.

Primary Examiner—Toan N Pham
Assistant Examiner—Kerri McNally
(74) Attorney, Agent, or Firm—Sofer & Haroun, LLP

(57) ABSTRACT

An alcohol monitoring system for monitoring a driver of a car includes a vapor analyzer system for detecting the amount of alcohol in a driver operating the car. A speed controller is provided for setting the maximum speed of the car to a predetermined level in the event that the amount of alcohol detected in the driver is above a predetermined threshold. A cell phone is configured to automatically call a remote call center, in the event that the amount of the alcohol detected in the driver is above the predetermined threshold. Furthermore, a location system is configured to provide the location of the car to said remote call center. A mapping database in said remote call center is configured to provide nearest resting locations to said car so as to guide the driver to drive the car to any one of said locations.

22 Claims, 2 Drawing Sheets

U.S. PATENT DOCUMENTS

| | | | |
|---|---|---|---|
| 2004/0212506 A1* | 10/2004 | Cherouny et al. | 340/576 |
| 2005/0004736 A1* | 1/2005 | Belcher et al. | 701/50 |
| 2005/0087382 A1* | 4/2005 | Bellehumeur | 180/272 |
| 2005/0099310 A1* | 5/2005 | Jones | 340/576 |
| 2005/0148894 A1* | 7/2005 | Misczynski et al. | 600/513 |
| 2006/0044144 A1* | 3/2006 | Duval | 340/576 |

* cited by examiner

CAR ALCOHOL MONITORING SYSTEM

RELATED APPLICATIONS

This application claims priority to provisional application 60/652,348 filed Feb. 11, 2005, incorporated herein by reference.

FIELD OF THE INVENTION

The present invention as described in various embodiments is directed to a continuous driver alcohol monitoring and intervention system.

BACKGROUND OF THE INVENTION

Drunk driving is the cause of many injuries and deaths. Every year around 20,000 people are killed in alcohol-related crashes. Many states have imposed requirements for car interlocking devices that are operated by those who have been arrested or convicted for drunk driving. These systems typically require the driver to take a breath test by employing a mouth piece installed in the car and measuring the alcohol level emanated from the user's breath. However, these systems can be bypassed by having the driver's companions take the test to activate the car ignition system.

As such there is a need for a car alcohol monitoring system that prevents efforts to bypass the ignition interlocking mechanisms provided in the car.

SUMMARY OF THE INVENTION

The Car alcohol monitoring system in accordance with various embodiments of the present invention monitors the driver's alcohol level continuously during the operation of the car. It uses a special sensor inside the steering wheel that detects the alcohol coming from the driver's perspiration. If it detects alcohol, the system automatically notifies a designated number for assistance.

In accordance with another embodiment of the invention, the system undertakes various predetermined responses upon detection of illegal alcohol levels. For example, the system enables a control module within the car to limit the speed to a predetermined maximum speed, to minimize the impact of a collision. Furthermore, it establishes a two way communication between a remote operator and the driver of the vehicle, to allow the operator to determine the severity of the circumstance and safely guide the driver to a safe location for help to arrive.

In accordance with another embodiment of the invention, the system also tracks the events after detection of an illegal level of alcohol in the driver's body, including recording the conversation between the operator and the driver, the actions taken and final disposition of the circumstance.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 2:
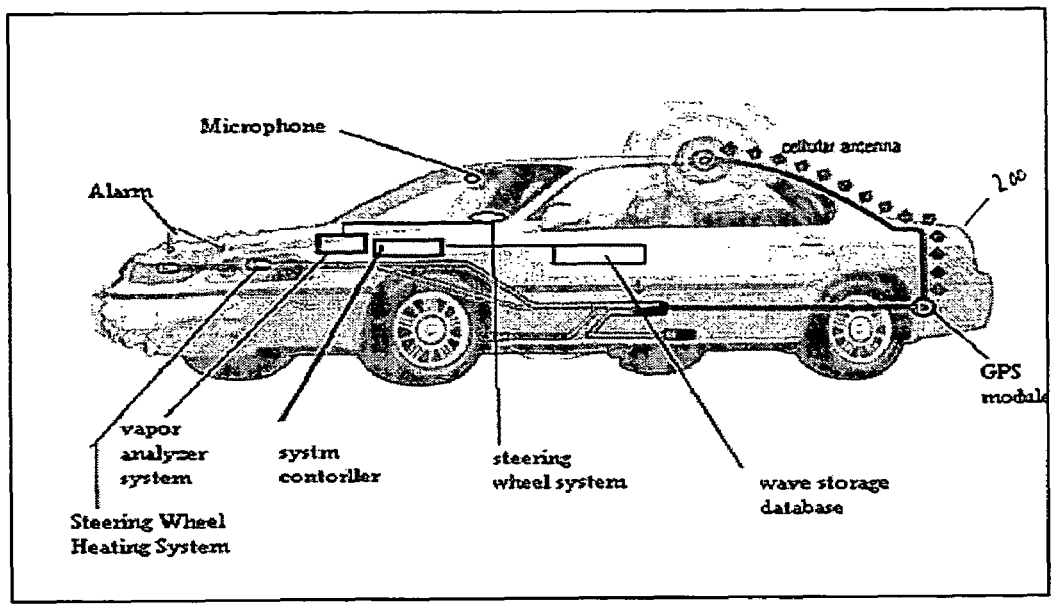
FIG. 2 illustrates the car alcohol monitoring system of FIG. 1 in place within a vehicle, in accordance with one embodiment of the present invention.

Car alcohol monitoring system 40 in accordance with various embodiments of the present invention monitors the driver's alcohol level continuously during the operation of a car, such as car 200 depicted in FIG. 2.

Figure 1:
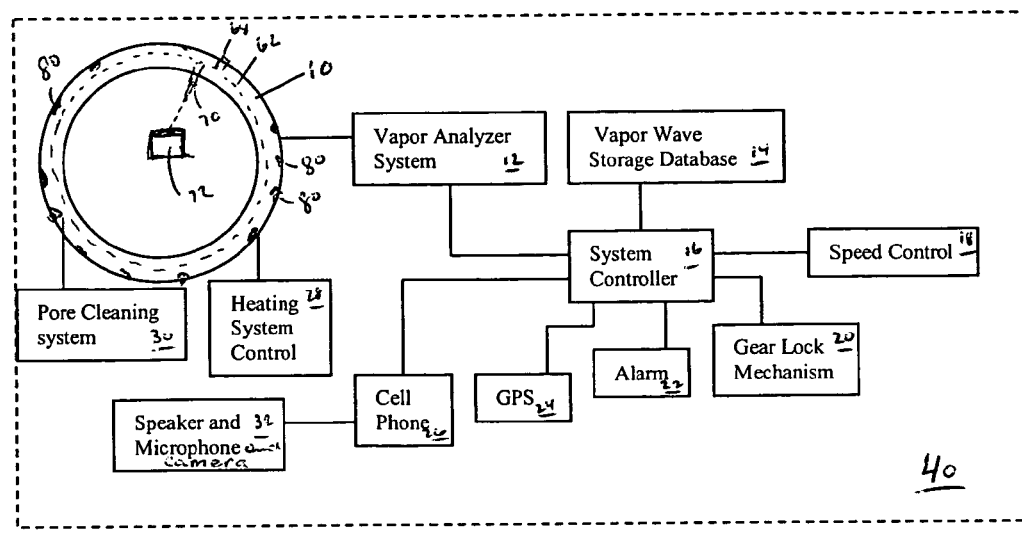
FIG. 1 illustrates a car alcohol monitoring system, in accordance with one embodiment of the invention.

In accordance with one embodiment of the invention, as illustrated in FIG. 1, a system controller 16 monitors and controls the various features of the system. Monitoring system 40 uses a special sensor inside the steering wheel that detects the alcohol contained in the driver's perspiration. If it detects alcohol, or levels of alcohol that are deemed dangerous, the system automatically notifies a designated number for assistance. The system has additional features which are described below FIG. 1 describes each of the elements in accordance with one embodiment of the invention. Accordingly, steering wheel 10 is configured to monitor the level of ethanol emanated from the driver's palms when grabbing the wheel. The mechanism for detecting alcohol from a user's skin has been described in various patents, including U.S. Pat. No. 5,220,919 entitled Blood Alcohol Monitor, issued on Jun. 22, 1993, incorporated herein by reference. The device measures the blood alcohol level of a person by monitoring the alcohol level detected from the persons' perspiration. It includes various fail safe mechanisms, such as an arrangement for monitoring the skin temperature prior to performing the skin alcohol test to provide an indication of a barrier being placed between the device and the monitored person's skin. It also measures the distance from the person's skin, thereby preventing the person from moving far enough from the device to provide an inaccurate indication of the amount of alcohol in the person.

Another patent that describes an arrangement for measuring alcohol levels of a driver through skin is U.S. Pat. No. 5,969,615 entitled System For Monitoring And Encumbering Use Of A Hand Operated Machine By An Impaired Individual Through Detection Of Toxins In The Individual, issued on Oct. 19, 1999 (the '615 patent), incorporated herein by reference. The device draws vapor from the individual's hands through a sampling apparatus. The sampling apparatus contains an electrical coil, which is coated with a composite metal-nonmetal catalytic substance which causes ethanol to oxidize at the coil. When ethanol containing vapor passes over the coil, oxidation at the coil causes an electrical charge to build up on the coil. The charge build up is detected and processed in a discrimination bridge or a constant-current loop. The resulting signal is further processed and ultimately used to estimate the alcohol content of the individual.

The system described in the '615 patent includes various fail safe mechanisms. For example, a pH detector is provided to detect predetermined pH levels of the secretions from a driver's hands at the steering wheel. The pH levels are chosen so as to cover and respond to a range known to be normal for a high percentage of the population. The pH detector works in conjunction with the vapor-sampling elements such that the system can determine whether the individual's hands are in direct contact with the steering wheel.

Another patent that describes an arrangement for measure blood alcohol levels in a driver via skin is described in the U.S. Pat. No. 6,620,108, entitled Apparatus and Method For Determining Machine Operator Status, issued Sep. 16, 2003 and incorporated herein by reference.

It is noted that although various embodiments discussed above measure alcohol levels of the driver via skin, the invention is not limited in scope in that respect and other forms of measuring the driver's alcohol level is employed in accordance with other embodiments of the invention. For example, systems that measure the alcohol level via the driver's breath are used in one embodiment of the invention, requiring the driver to blow in a mouth piece that is coupled to vapor analyzer system 12.

In accordance with further embodiments of the present invention, steering wheel 10 includes a plurality of collection tubes 68, that are fluidly connected to a circular tube 62 embedded within steering wheel 10. A plurality of tubes 70 are fluidly connected to tube 62, for directing collected gas to a monitor 72. Collection tubes 68 includes pores that allow vapors emanating from the driver's hands be collected and directed to monitor 72.

Over time, pores disposed within tube 68 can get clogged as a result of operation with dirty hands, to the extent that the accuracy of the system may diminish. In accordance with one embodiment of the invention, a pore cleaning system 30 is coupled to steering wheel 10. Pore cleaning system 30, may include a high pressure vacuuming or blowing arrangement that is in fluid communication with tubes 68. To this end, pore cleaning system 30 periodically either blows high pressure air through tube 68 or causes a high-pressure suction to vacuum air through tubes 68. As such pore cleaning system 30 clears the clogs that can develop in the pores of steering wheel 10.

In many circumstances, monitoring system 40 needs to measure the driver's alcohol level, before allowing the car to move any further. However, in very cold conditions, the driver's hand may not perspire immediately, as the steering wheel an the interior temperature in the car can be very cold also. Heating system control 28 is coupled to a plurality of heating elements 80 embedded within the steering wheel. Heating elements 80, in accordance with one embodiment of the invention, can heat up the steering wheel promoting the perspiration on the driver's hands. In one embodiment, heating system control 28 is configured to operate automatically, based on the ambient temperature inside the car and the temperature of the steering wheel.

Monitor 72 is coupled to vapor analyzer system 12, which in accordance with various embodiments of the invention, measures the alcohol content in the vapor collected from the driver's hands. It is noted that vapor analyzer 12 continuously monitors the alcohol level contained in the driver's body. This allows for detecting intoxication, even if the driver began operating the car sober, but began consuming alcohol during driving. Furthermore, this allows for detecting intoxication, when the driver consumed a substantial amount of alcohol right before operating the car, and the ethanol content in the driver's perspiration had not reached a detectable level before driving the car.

In accordance with one embodiment of the invention, a vapor wave storage database 14 is provided to compare the spectral characteristics of the vapor collected from the driver's perspiration, against the spectral characteristics of a vapor that is considered to contain gases within a normal range. Accordingly, based on how much alcohol is in the vapor, the vapor analyzer sends different electrical waves to the system controller. The system controller then sends these different waves to the wave storage database. The system controller compares the wave that is received from the vapor analyzer with the waves that are already stored in the wave storage database. However, this embodiment is only one example of determining illegal or dangerous alcohol levels and the present invention is not limited in scope to such an arrangement for detecting alcohol content.

Monitoring system 40 also includes a speed controller 18, which is configured to limit the maximum speed of the car when there is an indication that the driver is intoxicated. Speed controller 18, in accordance with one embodiment of the invention, is coupled to the car's fuel injection system, in order to control the amount of fuel injected to the car's engines. Speed Controller 18, in accordance with another embodiment of the invention, may also be coupled to the air valve unit within the throttle system, so as to limit the amount of air that can be provided to the combustion mechanism, no matter how far the accelerator pedal is pushed down.

In accordance with another embodiment of the invention, monitoring system 40 also includes a gear lock mechanism 20, that is configured to set the car's gears to a predetermined low level when there is an indication that the driver is intoxicated. The low gear can increase the car engine's RPM, further preventing the car from moving above a predetermined speed.

Monitoring system 40 also includes an alarm unit 22. Alarm unit 22 is configured to trigger other alarm systems in the car such as blinking hazard lights to indicate a hazard condition to other cars moving within the vicinity of the intoxicated person's car. Other alarm conditions may include an emergency message played to the driver, providing instructions to pullover to safety, before an accident occurs.

Monitoring system 40 also includes a GPS system 24 that continuously monitors the location and the speed of the car. GPS system 24 is configured in accordance with one embodiment of the invention to transmit the location of the car to a remote call center that is employed to take further steps when there is an indication that the driver of the car is operating under intoxication.

Monitoring system 40 also includes a cell phone 26 that is configured to establish a telephone communication via speaker, microphone and camera system 32, between an operator assistant located at a call center 120 and the driver or other passengers located in car 200. The operator assistant can take various actions to ensure that the car is driven to a safe location, so that further assistance can arrive.

In accordance with one embodiment of the invention, various components described above are located within a car 200 as illustrated in FIG. 2, although the invention is not limited in scope to such an arrangement of the various components of monitoring system 10. In accordance with one embodiment of the invention, the features of the system that can establish communication with a system operator and provide the location of the car via the GPS system is previously provided in a commercial system referred to as On-star™ system, incorporated herein by reference.

Figure 3:
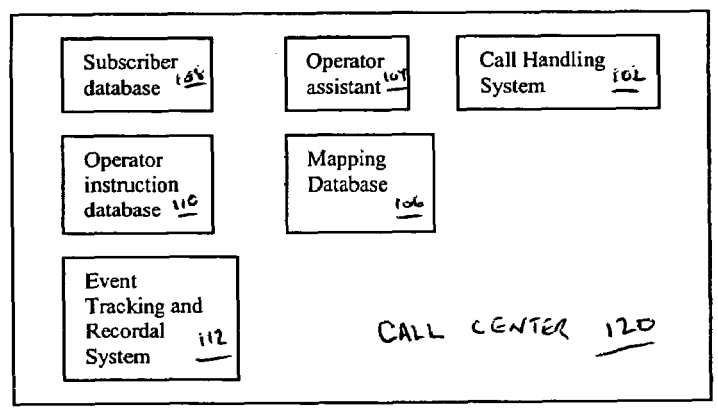
FIG. 3 illustrates a call center system for handling calls made to the center in response to detection of alcohol from a driver operating a subscribed vehicle.

FIG. 3, in accordance with one embodiment of the invention, illustrates various modules employed in a remote call center 120, when there is an indication that the driver operating car 200 is intoxicated, although the invention is not limited in scope in that respect. For example, although the embodiment described below relates to a call center for handling calls from a driver that is deemed intoxicated, in accordance with one embodiment of the invention, the call can be made to any predetermined number, such as the driver's parents, spouse, friends or relatives.

In accordance with one embodiment of the invention, call center 120 includes a call handling system 102. Call handling system is configured to receive cellular mobile phone calls and switch those calls to one of a plurality of operator assistants 104. In accordance with one embodiment of the invention, when a call is being established between car 200 and call center 120, a code sequence is transmitted during the call set up process from car 200 to call center 120, indicating that the call relates to an intoxicated driver situation. The code sequence, in accordance with another embodiment of the invention, includes information that identifies the subscriber vehicle from which the call is being made. Such a code may include Automatic Number Identification (ANI) for the cell phone from which the call is being made. In response call handling system 102 directs the call to an operator assistant 102 who has been trained to handle intoxicated driver situations.

Call center 120 includes a subscriber database 108 that includes the information of all subscribers to the system. This information, in accordance with various embodiments of the invention, includes subscriber's name and information, such as the vehicle type, the number of drivers that are authorized to drive the car and their names and password information and pictures.

Call center 120 employs an operator instruction database 110, which includes a predetermined script of the steps that need to be taken in the event that there is an indication that car 200 is being operated by an intoxicated driver. Such a script, in accordance with one embodiment of the invention, includes the operator asking questions from the driver to determine the identity of the driver and compare the driver's facial features with driver's pictures previously stored in the database. The script may also include additional phone numbers that the operator assistant can contact to inform others of the situation. For instance, in accordance with one embodiment of the invention, if the intoxicated person is the child of the subscriber, the parents can be notified of the situation. The script may also include instructions that the operator can recite to the driver, including the reasons that the operator has been automatically contacted, an indication of the situation and the alcohol level of the driver, an indication whether there are any other passengers in the car who are qualified to drive, an indication that the maximum speed of the vehicle has been set to a predetermined level and instructions to the driver to drive to a safe location and wait there until further help arrives.

Call center 120 also includes a mapping database 106. Mapping database calculates the closest safe location to car 200, such as the nearest gas station, restaurant, store or lodging based on the geographic location of the car as provided by GPS system 24. The operator can then provide turn by turn directions to the driver to guide the driver to the safe location.

The script can also include instructions, that in the event, the driver is too intoxicated to co-operate, emergency help should be summoned by contacting emergency personnel, such as the nearest police station or fire department.

In accordance with another embodiment of the invention mapping database 106 also includes a registry of individuals who have been enlisted as designated drivers. Based on the location of car 200, the registry is searched to determine whether a designated driver can be located within the vicinity of car 200. If so, operator assistant 104 contacts the designated driver and provides information and location of the car so that the designated driver can travel to car 200 and take the driver back home. Such a system may be implemented either commercially or on a volunteer basis.

Call center 120 also includes an event tracking and recordal system that is configured to record all the events that transpired from the time call enter 120 is contacted by cell phone 26 until the situation has been resolved. This information can help the system administrators to determine the efficacy of the procedures, monitor the quality of call handling by operator assistants and improve training for future applications.

During operation, when the driver enters car 200, he/she puts their hands on steering wheel 10. Steering wheel heating system 28 turns "on" to make the hand perspire. In accordance with one embodiment of the invention, if the hands are gloved or the steering is not getting any perspiration vapor, the car won't start, or if it starts speed control 18 limits the speed such that the car won't go faster than a predetermined speed such as 15 mph. The monitoring system is continuous. The process keeps repeating as long as the car is operating Based on the description of alcohol monitoring system above, the invention intends to minimize the number of deaths each year due to drunk driving. While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

I claim:

1. An alcohol monitoring system for monitoring a driver of a vehicle comprising:
 a system for detecting amount of alcohol in a driver operating the vehicle to determine whether said driver is deemed intoxicated;
 a speed controller for setting a maximum speed of the vehicle to a predetermined level above zero in the event that the amount of alcohol detected in the driver is above a predetermined threshold and said driver is deemed intoxicated, said speed is set so as to minimize the impact of a collision while the vehicle is being driven by said intoxicated driver;
 a cell phone configured to automatically call a remote call center, in the event that the amount of the alcohol detected in the driver is above the predetermined threshold so as to allow an operator at said remote call center to safely guide said driver to a safe location; and
 a location system configured to provide the location of the vehicle to said remote call center so as to allow said remote call center to employ a mapping database configured to provide nearest resting locations to said vehicle so as to guide the driver to drive the vehicle to any one of said locations at a speed not more than said maximum speed, wherein said driver receives a communication from said call center based on information stored in a database, and wherein said database stores the identity of a plurality of designated drivers, said database allowing said operator to send a request to at least one of said designated drivers.

2. The system in accordance with claim 1 further comprising a steering wheel having a plurality of pores for conducting vapor generated from driver's perspiring pores, wherein said alcohol detecting system includes a vapor analyzer that produces an electrical signal in proportion to an amount of alcohol present in said vapor.

3. The system in accordance with claim 1 further comprising a camera system configured to provide an image of the driver to said remote call center.

4. The system in accordance with claim 3, wherein said remote call center further comprises a subscriber database enabling identification of said driver based on said image.

5. The system in accordance with claim 1, wherein when said cell phone automatically calls said remote call center, a code sequence is transmitted during a call set up process indicating that the call relates to said driver that has an alcohol level above the predetermined threshold.

6. The alcohol monitoring system of claim 1, wherein said location system tracks the location of the vehicle so as to find designated drivers in the vicinity of said vehicle.

7. The system in accordance with claim 1, further comprising a messaging system that plays an emergency message to said driver, providing instructions to pull over for safety.

8. An alcohol monitoring system employed in a vehicle comprising:
   a system for detecting amount of alcohol in a driver operating the vehicle to determine whether the driver is deemed intoxicated;
   a speed controller for setting a maximum speed of the vehicle to a predetermined level above zero in the event that the amount of alcohol detected in the driver is above a predetermined threshold and said driver is deemed intoxicated, said speed is set so as to reduce the impact of a collision while the vehicle is being driven by said intoxicated driver;
   a telecommunication system configured to automatically call a remote location, in the event that the amount of the alcohol detected in the driver is above the predetermined threshold;
   a speaker and microphone unit so as to allow hands free communication between the driver and a person located at said remote location so as to allow said person located at said remote location to safely guide said driver to a nearby safe location wherein information on said safe location is retrieved from a database located at said remote location; and
   a global positioning satellite system that provides the geographical location of the vehicle to said remote location for providing further assistance to said driver based on said remote location,
   wherein said driver receives from said remote location an indication that a designated driver will arrive at said driver's location, wherein said remote location identifies said designated driver based on information stored in a database in said remote location identifying at least one designated driver who is close to said driver.

9. The system in accordance with claim 8 further comprising:
   a steering wheel having a plurality of pores for conducting vapor generated from driver's perspiring pores, wherein said alcohol detecting system includes a vapor analyzer that produces an electrical signal in proportion to an amount of alcohol present in said vapor.

10. The system in accordance with claim 9, wherein said steering wheel includes a pore cleaning system configured to remove dirt and debris from said pores.

11. The system in accordance with claim 10, wherein said pore cleaning system further comprises an air blowing system to blow said dirt and debris Out.

12. The system in accordance with claim 9 further comprising a skin temperature monitor to monitor skin temperature prior to performing a skin alcohol test.

13. The system in accordance with claim 9 further comprising a distance measuring monitor to measure the distance of the steering wheel from the person's skin so as to provide an indication when a driver's hand is moved far enough for the system to indicate an accurate measurement of alcohol.

14. The system in accordance with claim 9 further comprising a pH detector so as to determine whether the driver's hands are in direct contact with said steering wheel.

15. The system in accordance with claim 9, wherein if said vapor analyzer system fails to detect alcohol because said driver failed to provide adequate perspiration for analysis said speed controller sets the maximum speed of the vehicle to said predetermined level above zero.

16. The system in accordance with claim 8 further comprising a camera system configured to provide an image of the driver to said remote location so as to determine whether said driver is authorized to drive the vehicle.

17. The system according to claim 8, further comprising a fuel injection system coupled to said speed controller so as to control the amount of fuel injected to the vehicle's engine.

18. The system in accordance with claim 8, further comprising an air valve unit within a throttle system coupled to said speed controller so as to control the amount of air that can be provided to the combustion mechanism.

19. The system in accordance with claim 8, further comprising a gear lock mechanism coupled to said speed controller, configured to set the vehicle's gears to a predetermined low level so as to maintain the speed of the vehicle at said predetermined level above zero.

20. The system in accordance with claim 8, wherein said driver receives from said remote location driving directions to said safe location.

21. The system in accordance with claim 8, wherein when said telecommunication system automatically calls said remote location, a code sequence is transmitted during said automatic call to said remote location indicating that the call relates to said intoxicated driver.

22. The system in accordance with claim 8 wherein an emergency message is played to said driver, via said speaker and microphone unit, providing instructions to pull over for safety.

* * * * *